H. E. HEATH.
BATTERY CRADLE FOR ELECTRIC VEHICLES.
APPLICATION FILED SEPT. 5, 1912. RENEWED JAN. 31, 1916.
1,209,962.
Patented Dec. 26, 1916.
2 SHEETS—SHEET 1.
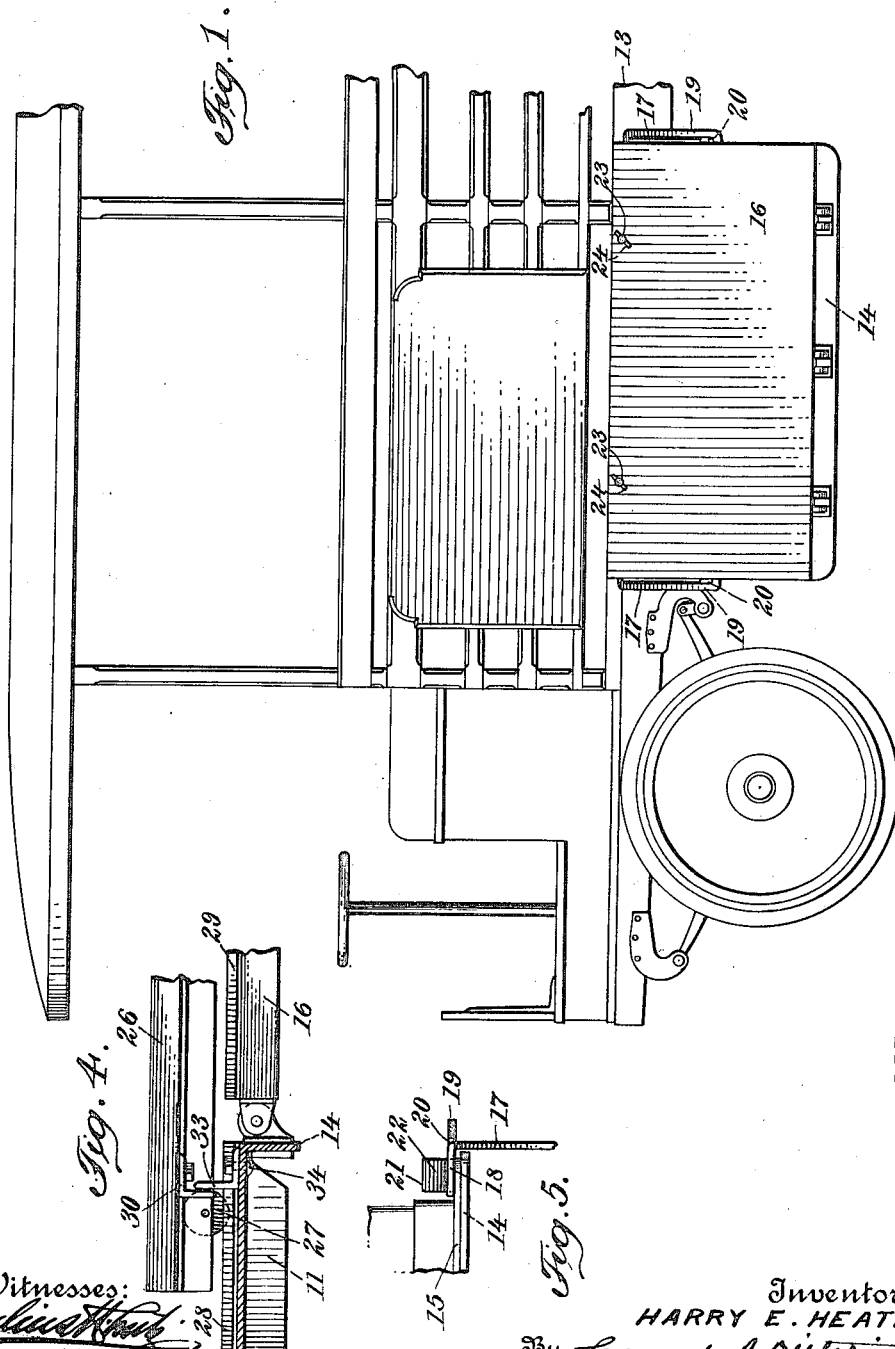
Witnesses:
Julius Stout
Edwin H. Dietrich
Inventor
HARRY E. HEATH
By Conrad A. Dieterich
his ATTORNEY.

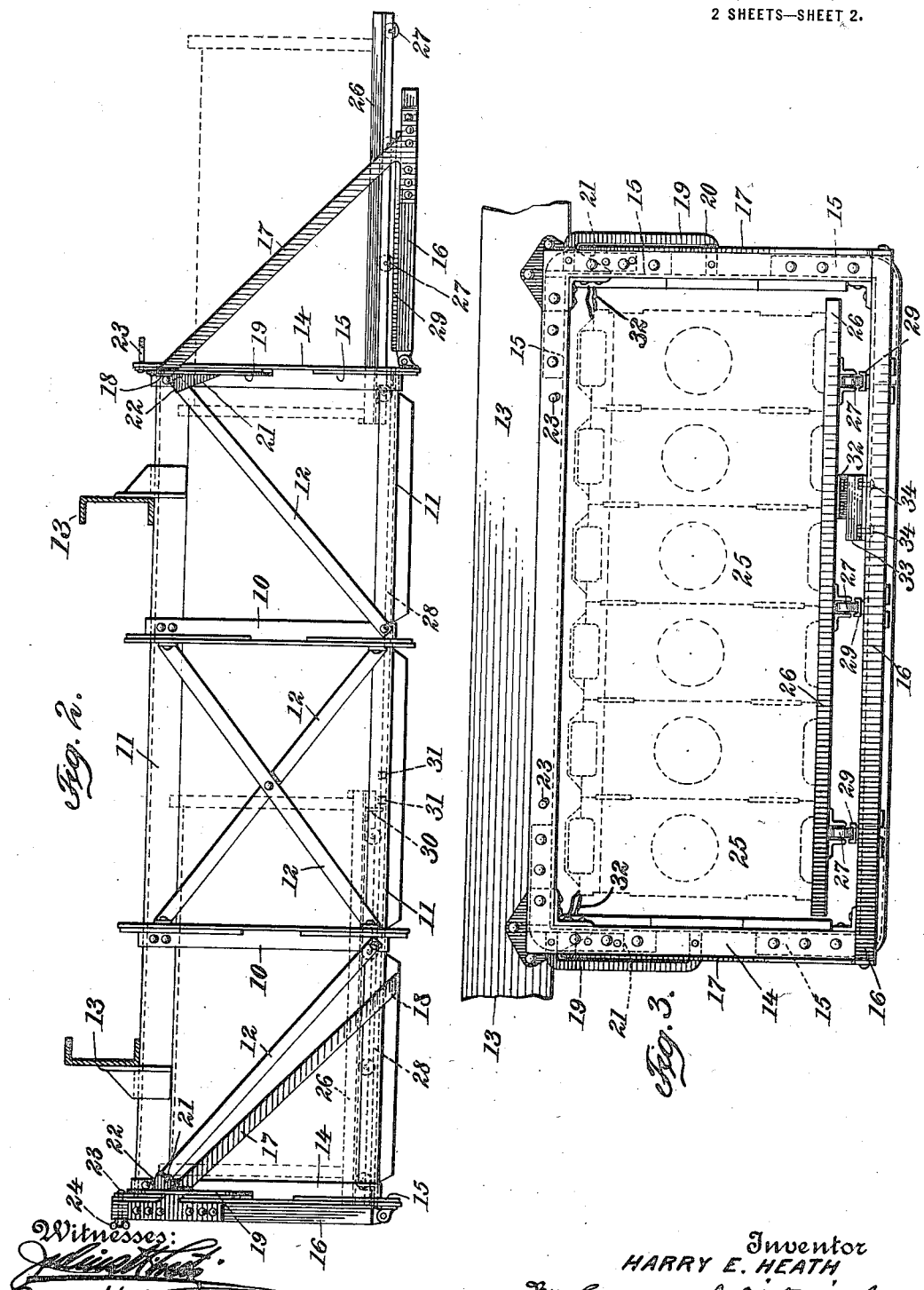

UNITED STATES PATENT OFFICE.

HARRY E. HEATH, OF NEWARK, NEW JERSEY, ASSIGNOR TO LANSDEN COMPANY, INC., A CORPORATION OF NEW YORK.

BATTERY-CRADLE FOR ELECTRIC VEHICLES.

1,209,962.  Specification of Letters Patent.  Patented Dec. 26, 1916.

Application filed September 5, 1912, Serial No. 718,726. Renewed January 31, 1916. Serial No. 75,469.

*To all whom it may concern:*

Be it known that I, HARRY E. HEATH, a citizen of the United States, residing at Newark, Essex county, in the State of New Jersey, have invented new and useful Improvements in Battery-Cradles for Electric Vehicles, of which the following is a full, clear, and exact specification.

This invention relates to electric vehicles and more especially to the box or cradle in which the storage batteries are carried.

One of the objects of the invention is to provide a device of this character which will permit the batteries to be handled or removed with ease.

Another object is to provide a device in which the doors of the box or cradle may be used as shelves for supporting the batteries.

Another object is to provide means by which the batteries may be locked against movement until it is desired to remove them for any purpose.

Other objects will in part be obvious and in part be pointed out in the claims.

In the accompanying drawing, showing an illustrative embodiment of the invention, and in which the same reference numerals refer to similar parts in the several figures, Figure 1 is a view in side elevation of a portion of a vehicle, showing the box or cradle in end view; Fig. 2 is a side elevational view of the box or cradle; Fig. 3 is an end view showing the door in its lowered or open position; Fig. 4 is a detail view, on an enlarged scale, of the lower part of the door and a portion of the cradle; Fig. 5 is a detail view, on an enlarged scale, of the brace which holds the door in its open position.

Referring to the drawings, the box or cradle for supporting the storage batteries comprises vertical members 10, longitudinal members 11, and diagonal members 12, secured to one another to form a trussed structure which is carried by the frame or chassis 13 of the vehicle. At the ends of the cradle, door frames 14 are provided which, in the embodiment shown, are of rectangular form, being preferably reinforced at the corners with angular reinforcing members 15, which are riveted to the door frames on the rear sides thereof. The doors 16 are hinged at their lower edges to the lower horizontal portions of the door frames 14, whereby the doors may be lowered to occupy a horizontal position. The hinges of the doors are so positioned that the doors will form a continuation of the cradle floor when they are in their open, horizontal position, thereby serving as shelves, the inner surface of the doors being substantially flush with the floor, as clearly shown in Fig. 2.

In order to hold the doors rigid when they are in their horizontal, open positions, rigid side braces 17 are provided, each of which has one of its ends firmly secured to one of the side edges of the door adjacent to its upper edge. These braces extend inwardly with respect to the door, at an angle of 45 degrees therewith. At its inner or free end, each brace 17 is provided with a bent portion 18 adapted to engage the rear surface of the door frame 14, as clearly shown in Fig. 5. The length of the braces 17 is such that when the bent portions 18 are in engagement with the door frames, the doors will be horizontal, as above described.

In order to prevent lateral movement of the braces guides 19, of U-shape, are secured to the vertical members of the door frames 14, being spaced therefrom to form guideways 20, through which the braces 17 pass. To positively maintain the free ends of the braces 17 in their proper positions when the door is open, supporting members 21 are secured to the vertical members of the door frames 14 and are provided with curved upper edges 22 with which the bent portions 18 of the braces 17 will engage, thus forming a rigid support for the doors 16 when the same are fully opened to their horizontal positions. The door may be held in its closed position by any suitable means, as, for example, by bolts 23 which pass through openings in the door and are adapted to receive wing nuts 24 on their threaded outer ends.

The storage batteries 25 are placed on trays 26 provided with rollers 27, which run on rails 28, which are preferably channel shaped, as shown in Fig. 3. The inner surfaces of the doors 16 are also provided with rails 29 corresponding to the rails 28, and arranged to form a continuation of the rails 28 when the door is in its open position, whereby the trays may be drawn out upon the doors, as shown in dotted lines in Fig. 2. Two trays are preferably provided, each being substantially half the length of the cradle. While in the embodiment of the invention shown, the rollers 27 are carried by the trays, and the rails 28 and 29 are carried by the cradle and the doors, it will of course be understood, without further illustration, that the rails could be carried by the trays, and the rollers carried by the cradle and doors, without in any way departing from the spirit of the invention. In both instances, the co-action of the rollers and the rails serve as guiding means as the trays are moved outwardly or inwardly.

In order to limit the inward movement of the trays 26, the same are provided with depending projections 30 adjacent to their rear or inner ends, which projections are adapted to engage with stops 31 secured upon the bottom of the cradle. When the trays 26 are properly positioned within the cradle, any movement thereof in a direction transversely of the vehicle will be prevented by reason of the engagement of the forward ends of said trays with the inner sides of the doors 16. The bottom of the cradle adjacent to each of its forward or outer ends is provided with a stop 33, which is so arranged that by removing one of its securing bolts 34, the said stop 33 may be swung about the other bolt as a pivot, out of the way of the depending projection 30 carried by the tray when it is desired to remove the tray from the vehicle, or to replace the same with another tray.

The operation of the device, which should be largely obvious from the above description, is as follows: Assuming the parts to be in their normal positions, if it is desired to have access to the batteries on either of the trays, it is merely necessary to remove the wing nuts 24 from the bolts 23 of the door 16 and open the door to its horizontal position, and then disconnect the conductors 32, from the batteries. Hereupon the trays 26 may be drawn outwardly until the projection 30 depending from the under side of the tray, adjacent to the rear thereof, engages with the stop 33 fixed adjacent to the forward or outer end of the cradle, and thereby prevents the further outward movement of said tray 26 with its batteries thereon. When it is desired to remove the trays 26 entirely from the vehicle, one of the bolts 34 in the stop 33 is removed, as above described, and the stop then moved out of the path of the projection 30, whereupon said tray may be removed from its support. When it is desired to restore the tray 26 to its normal position, it is merely rolled back into the cradle until the projection 30 on said tray engages with its stop 31, or the rear end of said tray 26 engages with the rear end of the tray inserted from the opposite side of the cradle, and thereby arrests the further inward movement thereof. Hereupon the door 16 is closed, and locked in position by replacing the wing nuts 24 upon the bolts 23.

Having described the invention, to the illustrative embodiment of which the invention is not of course to be limited, what is claimed as new and what is desired to be secured by Letters Patent is set forth in the appended claims:

1. In an electric vehicle, in combination, a battery cradle comprising a door frame, a door hinged thereto and adapted in its open position to form a continuation of the floor of said cradle, braces secured to said door having their inner ends free, means at the free ends of said braces for limiting the outward movement of said door, means for guiding said free ends in the movement of said door, and means for guiding said limiting means into position and supporting the same whereby to maintain the outer end of said door against further downward movement when the same is fully opened to its horizontal position, substantially as specified.

2. In an electric vehicle, in combination, a battery cradle comprising a door frame, guides arranged at the ends of said frame, a door hinged to said frame and adapted in its open position to form a continuation of the floor of said cradle, braces secured to the outer ends of said door and having their inner ends free and extending through said guides, means at the free ends of said braces adapted to contact with said frame to limit the outward movement of said door, and inclined members arranged adjacent to the upper ends of said guides for guiding said limiting means into position and supporting the same whereby to maintain the outer end of said door against further downward movement when the same is fully opened to its horizontal position, substantially as specified.

3. In an electric vehicle, in combination, a battery cradle comprising a door frame, vertical slotted members arranged adjacent to the opposite upper ends of said frame, a door hinged to said frame and adapted in its open position to form a continuation of the floor of said cradle, braces secured to the outer ends of said door and having their inner ends free and extending through said vertical slotted members, projections at the free ends of said braces adapted to contact with said slotted members to limit the outward movement of said door, lugs extending inwardly from said frame having cam surfaces at their upper ends arranged adjacent to the upper ends of said slotted members for guiding the inner free ends of said braces and the projections thereon into position and supporting the same thereon in order to maintain the outer end of said door against further downward movement when the same is fully opened to its horizontal position, substantially as specified.

4. In an automobile vehicle, the combination of a body with a continuous fixed floor, a battery cradle suspended underneath said floor, a hinged door at one side of said cradle and means attached to said cradle and door for limiting the downward movement of said door to a level with the bottom of said cradle, said door and said means being capable of supporting the entire weight of said battery.

5. In an automobile vehicle, the combination of a chassis, a closed storage battery cradle suspended beneath said chassis and having a plurality of reinforcing members to give the same great strength and rigidity, a hinged door at one end of said cradle provided with reinforcing members and means attached to said cradle and door to hold firmly said door at a level with the bottom of said cradle when said door is fully opened, said door being capable of supporting the entire weight of said batteries.

Signed at the city of New York, in the county and State of New York, this 6th day of August, 1912.

HARRY E. HEATH.

Witnesses:
W. L. CASE,
CONRAD A. DIETERICH.